United States Patent
Chen et al.

(10) Patent No.: US 12,461,671 B2
(45) Date of Patent: Nov. 4, 2025

(54) MEMORY MANAGEMENT METHOD FOR IMPROVING THE UTILIZATION RATE, MEMORY STORAGE DEVICE, AND MEMORY CONTROL CIRCUIT UNIT

(71) Applicant: Hefei Core Storage Electronic Limited, Anhui (CN)

(72) Inventors: Yang Chen, Anhui (CN); Kuai Cao, Anhui (CN); Dong Sheng Rao, Anhui (CN); Yue Hu, Anhui (CN); Qin Qin Tao, Anhui (CN)

(73) Assignee: Hefei Core Storage Electronic Limited, Anhui (CN)

( * ) Notice: Subject to any disclaimer, the term of this patent is extended or adjusted under 35 U.S.C. 154(b) by 42 days.

(21) Appl. No.: 18/760,049

(22) Filed: Jul. 1, 2024

(65) Prior Publication Data

US 2025/0244891 A1    Jul. 31, 2025

(30) Foreign Application Priority Data

Jan. 25, 2024    (CN) .......................... 202410102019.0

(51) Int. Cl.
*G06F 3/06* (2006.01)

(52) U.S. Cl.
CPC .......... *G06F 3/0631* (2013.01); *G06F 3/0604* (2013.01); *G06F 3/0679* (2013.01)

(58) Field of Classification Search
CPC ..... G06F 3/0631; G06F 3/0604; G06F 3/0679
See application file for complete search history.

(56) References Cited

U.S. PATENT DOCUMENTS

2007/0030734 A1   2/2007   Sinclair et al.
2011/0187894 A1*   8/2011   Hamada ............. G11B 20/1889
                                                   348/231.1

(Continued)

FOREIGN PATENT DOCUMENTS

CN          1048462        1/1991
CN        107590080        1/2018

(Continued)

OTHER PUBLICATIONS

"Office Action of Taiwan Counterpart Application", issued on Aug. 26, 2024, pp. 1-6.

*Primary Examiner* — Brian R Peugh
(74) *Attorney, Agent, or Firm* — JCIPRNET

(57) ABSTRACT

A memory management method, a memory storage device, and a memory control circuit unit are provided. The method includes: in response to receiving a data management command from a host system, calculating a plurality of occupied capacities required for a plurality of system management information respectively stored in a plurality of physical erasing units based on a capacity of an allocation unit; executing a data consolidation operation based on the occupied capacities, and in response to an occupied capacity being greater than a capacity of a physical erasing unit, copying system management information corresponding to the occupied capacity to at least one first physical erasing unit; and in response to a sum of at least one occupied capacity not being greater than the capacity of the physical erasing unit, copying at least one system management information corresponding to the at least one occupied capacity to a second physical erasing unit.

9 Claims, 7 Drawing Sheets

(56) References Cited

U.S. PATENT DOCUMENTS

| | | | |
|---|---|---|---|
| 2013/0067138 A1 | 3/2013 | Schuette et al. | |
| 2013/0097367 A1 | 4/2013 | Flynn et al. | |
| 2014/0207997 A1* | 7/2014 | Peterson | G06F 12/0246 |
| | | | 711/159 |
| 2019/0235781 A1 | 8/2019 | Gong et al. | |
| 2023/0022758 A1* | 1/2023 | Sears | G06F 3/0652 |

FOREIGN PATENT DOCUMENTS

| | | |
|---|---|---|
| CN | 110147203 | 8/2019 |
| CN | 111723056 | 9/2020 |
| CN | 114168084 | 3/2022 |
| CN | 115495020 | 12/2022 |
| CN | 115951832 | 4/2023 |
| CN | 117311621 | 12/2023 |
| TW | I563510 | 12/2016 |
| TW | 201724110 | 7/2017 |
| TW | 201730888 | 9/2017 |
| TW | I602061 | 10/2017 |
| WO | 2023116235 | 6/2023 |

* cited by examiner

MEMORY MANAGEMENT METHOD FOR IMPROVING THE UTILIZATION RATE, MEMORY STORAGE DEVICE, AND MEMORY CONTROL CIRCUIT UNIT

CROSS-REFERENCE TO RELATED APPLICATION

This application claims the priority benefit of China application serial no. 202410102019.0, filed on Jan. 25, 2024. The entirety of the above-mentioned patent application is hereby incorporated by reference herein and made a part of this specification.

BACKGROUND

Technical Field

The disclosure relates to a memory management technology, and in particular to a memory management method, a memory storage device, and a memory control circuit unit.

Description of Related Art

Smartphones, tablet computers, and notebook computers have grown rapidly in recent years, resulting in a rapid increase in consumer demand for storage media. Since the rewritable non-volatile memory module (for example, a flash memory) has characteristics such as non-volatile data, power saving, small size, and no mechanical structure, the rewritable non-volatile memory module is very suitable to be built into various portable multimedia devices exemplified above.

Generally speaking, a memory storage device includes a rewritable non-volatile memory module and a memory control circuit unit. A certain capacity (multiple storage spaces) in the rewritable non-volatile memory module is used to store various system management information to ensure the reliability and stability of the memory storage device. Specifically, the system management information is, for example, various mapping tables and/or various variables for managing user data. In the conventional technology, the memory control circuit unit uses an operating unit (for example, a physical erasing unit) of the rewritable non-volatile memory module as an allocation unit to configure the storage spaces respectively used to store each type of system management information in the rewritable non-volatile memory module.

With the development of memory storage device technology, in the case where the capacity of the rewritable non-volatile memory module remains unchanged, the capacity of the physical erasing unit (for example, a physical block) is becoming larger, that is, the total number of physical erasing units is becoming smaller. However, the actual capacities occupied by various system management information are mostly less than the capacity of one physical erasing unit. Accordingly, the above method causes a large amount of storage spaces in the rewritable non-volatile memory module to be wasted, making it difficult to satisfy the requirement for usage capacity by a user.

SUMMARY

The disclosure provides a memory management method, a memory storage device, and a memory control circuit unit, which can improve the utilization rate of a rewritable non-volatile memory module to satisfy the requirement for usage capacity by a user.

An exemplary embodiment of the disclosure provides a memory management method for a memory storage device. The memory storage device includes a rewritable non-volatile memory module and a memory control circuit unit. The memory management method includes the following steps. In response to receiving a data management command from a host system, multiple occupied capacities required for multiple system management information respectively stored in multiple physical erasing units are calculated based on a capacity of an allocation unit. A data consolidation operation is executed based on the occupied capacities, and in response to an occupied capacity being greater than a capacity of a physical erasing unit, system management information corresponding to the occupied capacity is copied to at least one first physical erasing unit. In response to a sum of at least one occupied capacity not being greater than the capacity of the physical erasing unit, at least one system management information corresponding to the at least one occupied capacity is copied to a second physical erasing unit.

In an exemplary embodiment of the disclosure, the step of calculating the occupied capacities required for the system management information respectively stored in the physical erasing units based on the capacity of the allocation unit includes respectively calculating each of the occupied capacities based on a user usage habit, a current capacity of each of the system management information, and the capacity of the allocation unit.

In an exemplary embodiment of the disclosure, the allocation unit is a minimum management unit of the memory control circuit unit.

In an exemplary embodiment of the disclosure, the minimum management unit is a segment.

In an exemplary embodiment of the disclosure, the memory management method further includes storing a configuration mapping table in a last one of the at least one first physical erasing unit and the second physical erasing unit.

In an exemplary embodiment of the disclosure, the configuration mapping table is used to store multiple physical addresses of the system management information.

In an exemplary embodiment of the disclosure, the system management information is respectively one of a logical-to-physical address mapping table (an L2P table), a bad block table, a free block list, garbage collection information, read count information, and erase count information.

An exemplary embodiment of the disclosure also provides a memory storage device, which includes a connection interface unit, a rewritable non-volatile memory module, and a memory control circuit unit. The connection interface unit is used to couple to a host system. The memory control circuit unit is coupled to the connection interface unit and the rewritable non-volatile memory module. The memory control circuit unit is configured to, in response to receiving a data management command from the host system, calculate multiple occupied capacities required for multiple system management information respectively stored in multiple physical erasing units based on a capacity of an allocation unit. The memory control circuit unit is further used to execute a data consolidation operation based on the occupied capacities, and in response to an occupied capacity being greater than a capacity of a physical erasing unit, copy system management information corresponding to the occupied capacity to at least one first physical erasing unit. The memory control circuit unit is further used to, in response to a sum of at least one occupied capacity not being greater than the capacity of the physical erasing unit, copy at least one system management information corresponding to the at least one occupied capacity to a second physical erasing unit.

In an exemplary embodiment of the disclosure, the memory control circuit unit is further used to respectively calculate each of the occupied capacities based on a user usage habit, a current capacity of each of the system management information, and the capacity of the allocation unit.

In an exemplary embodiment of the disclosure, the memory control circuit unit is further used to store a configuration mapping table in a last one of the at least one first physical erasing unit and the second physical erasing unit.

An exemplary embodiment of the disclosure also provides a memory control circuit unit, which is used to control a rewritable non-volatile memory module. The memory control circuit unit includes a host interface, a memory interface, and a memory management circuit. The host interface is used to couple to a host system. The memory interface is used to couple to the rewritable non-volatile memory module. The memory management circuit is coupled to the host interface and the memory interface. The memory management circuit is configured to, in response to receiving a data management command from the host system, calculate multiple occupied capacities required for multiple system management information respectively stored in multiple physical erasing units based on a capacity of an allocation unit. The memory management circuit is further used to execute a data consolidation operation based on the occupied capacities, and in response to an occupied capacity being greater than a capacity of a physical erasing unit, copy system management information corresponding to the occupied capacity to at least one first physical erasing unit. The memory management circuit is further used to, in response to a sum of at least one occupied capacity not being greater than the capacity of the physical erasing unit, copy at least one system management information corresponding to the at least one occupied capacity to a second physical erasing unit.

In an exemplary embodiment of the disclosure, the memory management circuit is further used to respectively calculate each of the occupied capacities based on a user usage habit, a current capacity of each of the system management information, and the capacity of the allocation unit.

In an exemplary embodiment of the disclosure, the memory management circuit is further used to store a configuration mapping table in a last one of the at least one first physical erasing unit and the second physical erasing unit.

Based on the above, in the memory management method, the memory storage device, and the memory control circuit unit of the disclosure, the occupied capacities required for the management information may be calculated based on a minimum management unit (for example, a segment) of the memory control circuit unit to configure the first physical erasing unit and the second physical erasing unit for storing the system management information according to the occupied capacities. In this way, the utilization rate of the rewritable non-volatile memory module can be improved to satisfy the requirement for usage capacity by a user.

In order for the features and advantages of the disclosure to be more comprehensible, the following specific embodiments are described in detail in conjunction with the drawings.

DESCRIPTION OF THE EMBODIMENTS

Generally speaking, a memory storage device (also referred to as a memory storage system) includes a rewritable non-volatile memory module and a controller (also referred to as a control circuit). The memory storage device may be used together with a host system, so that the host system may write data into the memory storage device or read data from the memory storage device.

Figure 1:
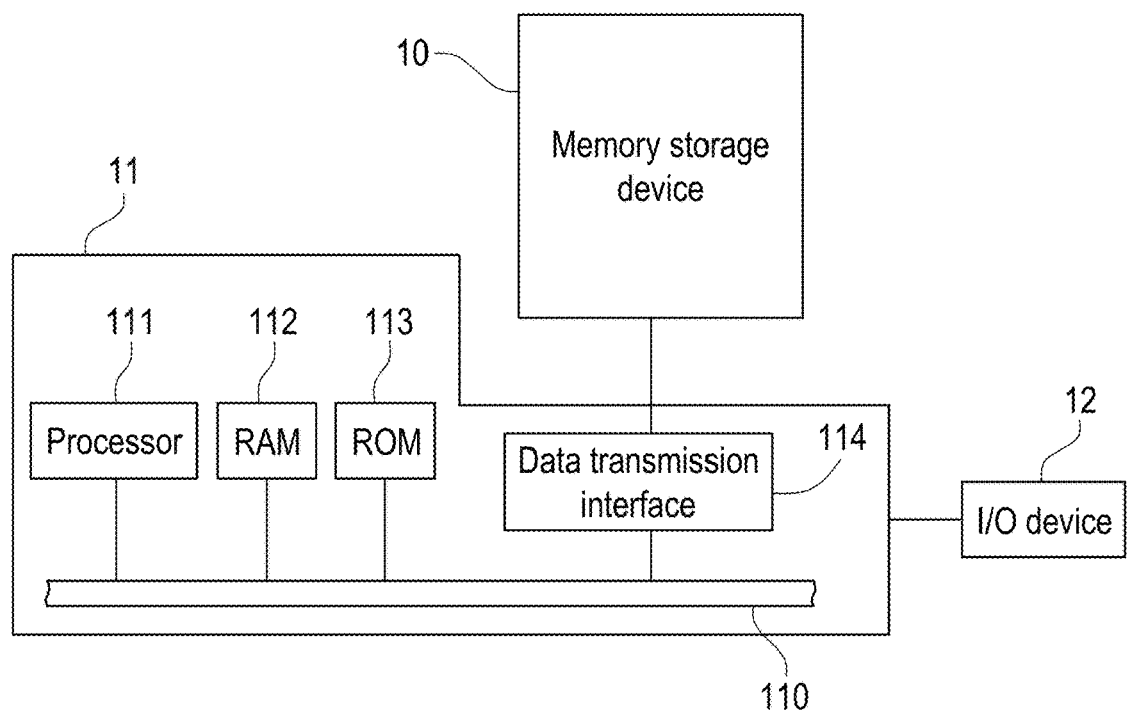
FIG. 1 is a schematic diagram of a host system, a memory storage device, and an input/output (I/O) device according to an exemplary embodiment of the disclosure.
Figure 2:
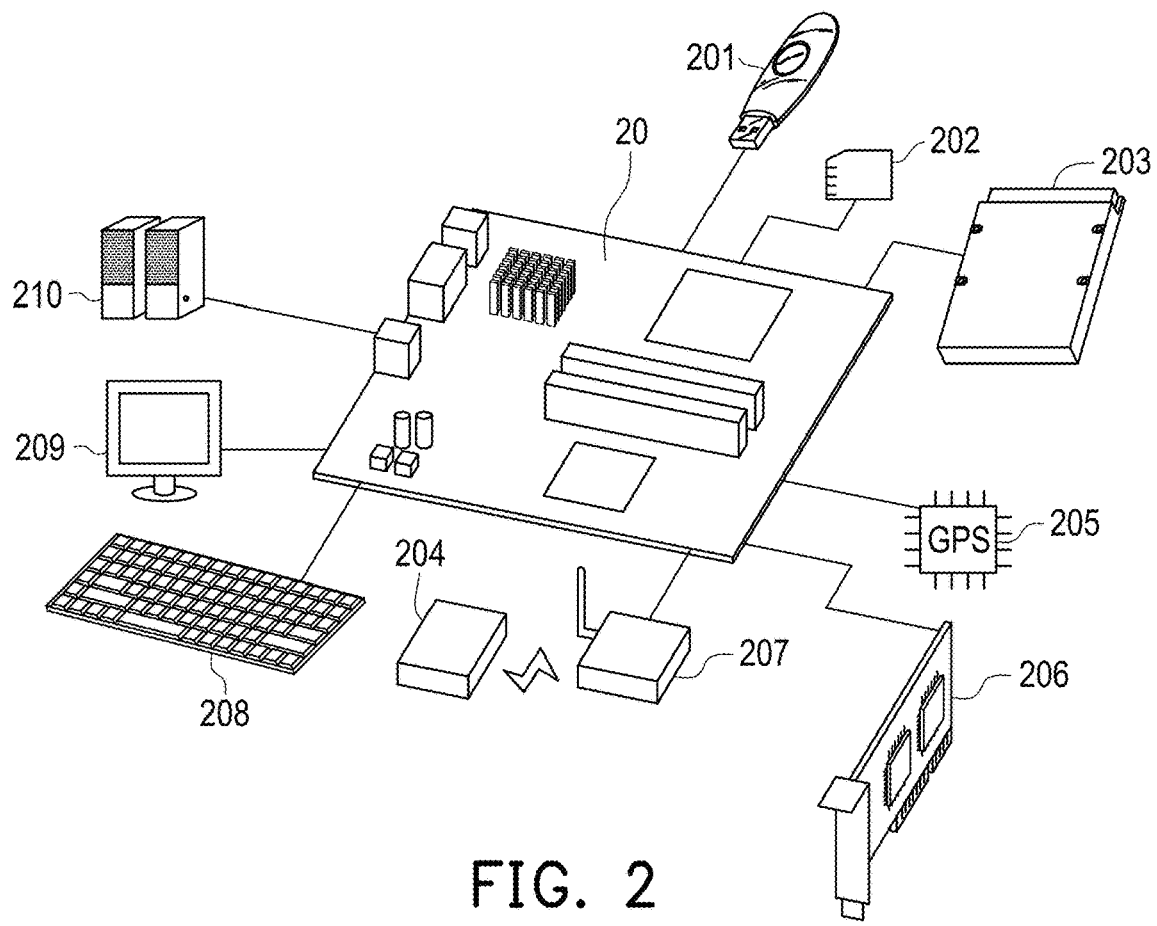
FIG. 2 is a schematic diagram of a host system, a memory storage device, and an I/O device according to an exemplary embodiment of the disclosure.

FIG. 1 is a schematic diagram of a host system, a memory storage device, and an input/output (I/O) device according to an exemplary embodiment of the disclosure. FIG. 2 is a schematic diagram of a host system, a memory storage device, and an I/O device according to an exemplary embodiment of the disclosure.

Please refer to FIG. 1 and FIG. 2. A host system 11 may include a processor 111, a random access memory (RAM) 112, a read only memory (ROM) 113, and a data transmission interface 114. The processor 111, the random access memory 112, the read only memory 113, and the data transmission interface 114 are all coupled to a system bus 110.

In an exemplary embodiment, the host system 11 may be coupled to the memory storage device 10 through the data transmission interface 114. For example, the host system 11 may store data to the memory storage device 10 or read data from the memory storage device 10 via the data transmission interface 114. In addition, the host system 11 may be coupled to the I/O device 12 through the system bus 110. For example, the host system 11 may send an output signal to the I/O device 12 or receive an input signal from the I/O device 12 via the system bus 110.

In an exemplary embodiment, the processor 111, the random access memory 112, the read only memory 113, and the data transmission interface 114 may be disposed on a motherboard 20 of the host system 11. The number of the data transmission interface 114 may be one or more.

Through the data transmission interface 114, the motherboard 20 may be coupled to the memory storage device 10 via a wired or wireless manner.

In an exemplary embodiment, the memory storage device 10 may, for example, be a flash drive 201, a memory card 202, a solid state drive (SSD) 203, or a wireless memory storage device 204. The wireless memory storage device 204 may, for example, be a near field communication (NFC) memory storage device, a WiFi memory storage device, a Bluetooth memory storage device, a low-power Bluetooth memory storage device (for example, iBeacon), or other memory storage devices based on various wireless communication technologies. In addition, the motherboard 20 may also be coupled to a global positioning system (GPS) module 205, a network interface card 206, a wireless transmission device 207, a keyboard 208, a screen 209, a speaker 210, and various other I/O devices through the system bus 110. For example, in an exemplary embodiment, the motherboard 20 may access the wireless memory storage device 204 through the wireless transmission device 207.

In an exemplary embodiment, the host system 11 is a computer system. In an exemplary embodiment, the host system 11 may be substantially any system that may cooperate with a memory storage device to store data. In an exemplary embodiment, the memory storage device 10 and the host system 11 may respectively include a memory storage device 30 and a host system 31 of FIG. 3.

Figure 3:
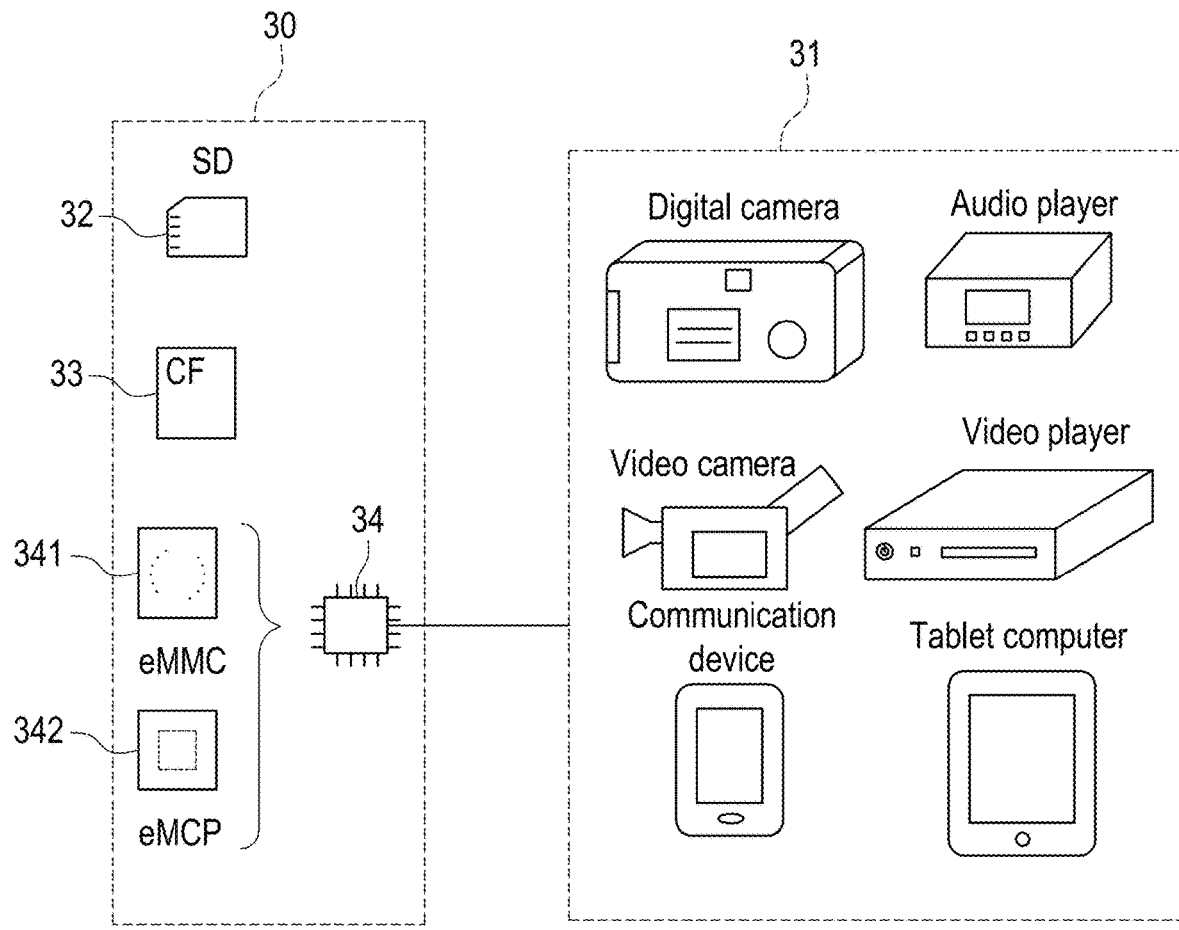
FIG. 3 is a schematic diagram of a host system and a memory storage device according to an exemplary embodiment of the disclosure.

FIG. 3 is a schematic diagram of a host system and a memory storage device according to an exemplary embodiment of the disclosure.

Please refer to FIG. 3. The memory storage device 30 may be used in conjunction with the host system 31 to store data. For example, the host system 31 may be a system such as a digital camera, a video camera, a communication device, an audio player, a video player, or a tablet computer. For example, the memory storage device 30 may be a secure digital (SD) card 32, a compact flash (CF) card 33, an embedded storage device 34, or various other non-volatile memory storage devices used by the host system 31. The embedded storage device 34 includes an embedded multi media card (eMMC) 341, an embedded multi chip package (eMCP) storage device 342, and/or various other embedded storage devices in which a memory module is directly coupled onto a substrate of a host system.

Figure 4:
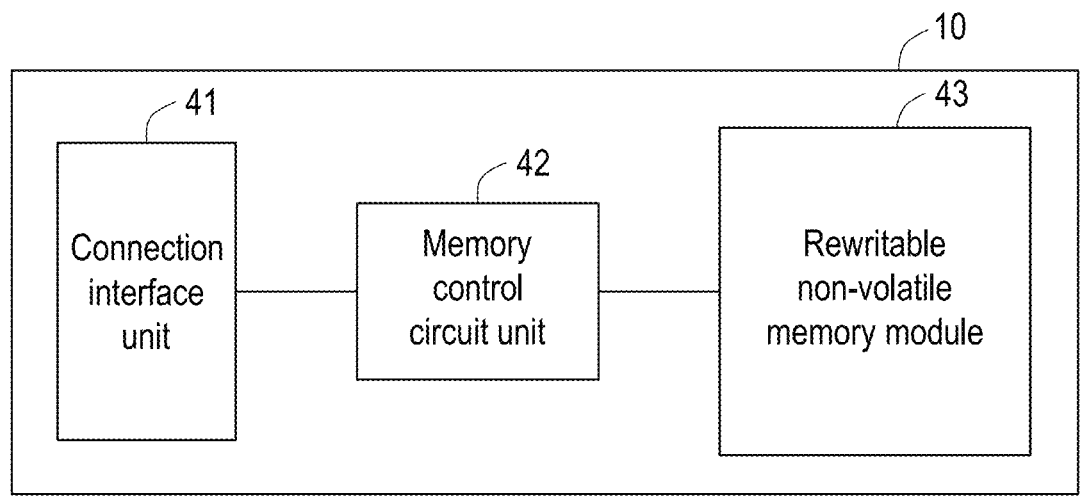
FIG. 4 is a schematic diagram of a memory storage device according to an exemplary embodiment of the disclosure.

FIG. 4 is a schematic diagram of a memory storage device according to an exemplary embodiment of the disclosure.

Please refer to FIG. 4. The memory storage device 10 includes a connection interface unit 41, a memory control circuit unit 42, and a rewritable non-volatile memory module 43. The memory control circuit unit 42 may, for example, be a microcontroller unit (MCU).

The connection interface unit 41 is used to couple the memory storage device 10 to the host system 11. The memory storage device 10 may communicate with the host system 11 via the connection interface unit 41. In an exemplary embodiment, the connection interface unit 41 is compatible with the peripheral component interconnect express (PCI express) standard. In an exemplary embodiment, the connection interface unit 41 may also conform to the serial advanced technology attachment (SATA) standard, the parallel advanced technology attachment (PATA) standard, the Institute of Electrical and Electronic Engineers (IEEE) 1394 standard, the universal serial bus (USB) standard, the SD interface standard, the ultra high speed-I (UHS-I) interface standard, the ultra high speed-II (UHS-II) interface standard, the memory stick (MS) interface standard, the MCP interface standard, the MMC interface standard, the eMMC interface standard, the universal flash storage (UFS) interface standard, the eMCP interface standard, the CF interface standard, the integrated device electronics (IDE) standard, or other suitable standards. The connection interface unit 41 may be packaged in one chip with the memory control circuit unit 42, or the connection interface unit 41 may be arranged outside a chip containing the memory control circuit unit 42.

The memory control circuit unit 42 is coupled to the connection interface unit 41 and the rewritable non-volatile memory module 43. The memory control circuit unit 42 is used to execute multiple logic gates or control commands implemented in the form of hardware or the form of firmware and perform operations such as data writing, reading, and erasing in the rewritable non-volatile memory module 43 according to a command of the host system 11.

The rewritable non-volatile memory module 43 is used to store data written by the host system 11. The rewritable non-volatile memory module 43 may include a single level cell (SLC) NAND flash memory module (that is, a flash memory module that may store 1 bit in one memory cell), a multi level cell (MLC) NAND flash memory module (that is, a flash memory module that may store 2 bits in one memory cell), a triple level cell (TLC) NAND flash memory module (that is, a flash memory module that may store 3 bits in one memory cell), a quad level cell (QLC) NAND flash memory module (that is, a flash memory module that may store 4 bits in one memory cell), other flash memory modules, or other memory modules with the same characteristics.

Each memory cell in the rewritable non-volatile memory module 43 stores one or more bits with changes in voltage (hereinafter also referred to as a threshold voltage). Specifically, there is a charge trapping layer between a control gate and a channel of each memory cell. Through applying a write voltage to the control gate, the number of electrons of the charge trapping layer may be changed, thereby changing the threshold voltage of the memory cell. The operation of changing the threshold voltage of the memory cell is also referred to as "writing data into the memory cell" or "programming the memory cell". As the threshold voltage changes, each memory cell in the rewritable non-volatile memory module 43 has multiple storage states. Through applying a read voltage, it is possible to judge which storage state a memory cell belongs to, so as to obtain one or more bits stored in the memory cell.

In an exemplary embodiment, memory cells of the rewritable non-volatile memory module 43 may constitute multiple physical programming units, and the physical programming units may constitute multiple physical erasing units. Specifically, the memory cells on the same word line may form one or more physical programming units. If each memory cell may store more than 2 bits, the physical programming units on the same word line may be classified into at least one lower physical programming unit and an upper physical programming unit. For example, a least significant bit (LSB) of a memory cell belongs to the lower physical programming unit, and a most significant bit (MSB) of a memory cell belongs to the upper physical programming unit. Generally speaking, in the MLC NAND flash memory, the write speed of the lower physical programming unit is greater than the write speed of the upper physical programming unit and/or the reliability of the lower physical programming unit is higher than the reliability of the upper physical programming unit.

In an exemplary embodiment, the physical programming unit is the smallest unit of programming. That is, the physical programming unit is the smallest unit of writing data. For example, the physical programming unit may be a physical page or a physical sector. If the physical programming unit is a physical page, the physical programming units may include a data bit area and a redundancy bit area. The data bit area contains multiple physical sectors for storing user data, and the redundancy bit area is used to store system data (for example, management data such as an error correcting code). In an exemplary embodiment, the data bit area contains 32 physical sectors, and the size of one physical sector is 512 bytes (B). However, in other exemplary embodiments, the data bit area may also contain 8, 16, more, or less physical sectors, and the size of each physical sector may also be greater or smaller. On the other hand, the physical erasing unit is the smallest unit of erasure. That is, each physical erasing unit contains the smallest number of memory cells to be erased together. For example, the physical erasing unit is a physical block.

Figure 5:
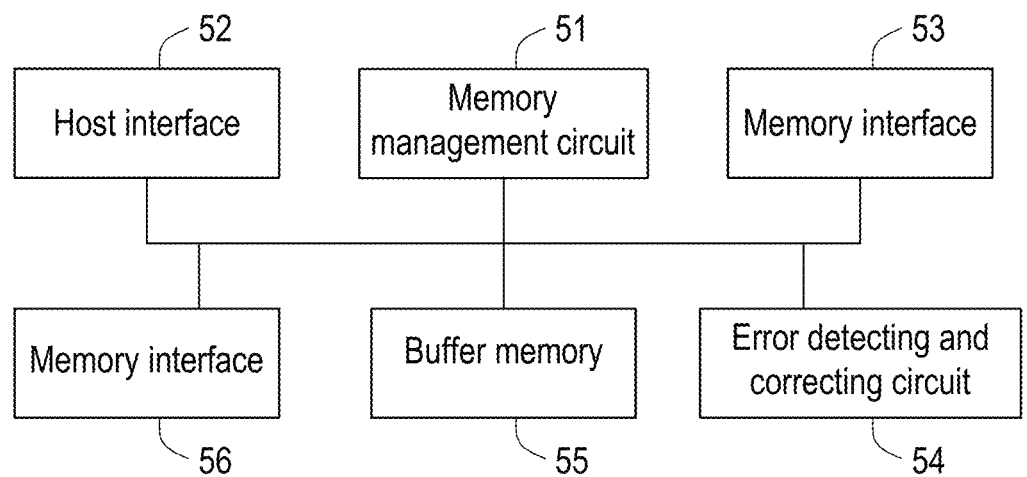
FIG. 5 is a schematic diagram of a memory control circuit unit according to an exemplary embodiment of the disclosure.

FIG. 5 is a schematic diagram of a memory control circuit unit according to an exemplary embodiment of the disclosure.

Please refer to FIG. 5. The memory control circuit unit 42 includes a memory management circuit 51, a host interface 52, and a memory interface 53.

The memory management circuit 51 is used to control the overall operation of the memory control circuit unit 42. Specifically, the memory management circuit 51 has multiple control commands, and when the memory storage device 10 is operating, the control commands are executed to perform operations such as data writing, reading, and erasing. The following description of the operation of the memory management circuit 51 is equivalent to the description of the operation of the memory control circuit unit 42.

In an exemplary embodiment, the control commands of the memory management circuit 51 are implemented in the form of firmware. For example, the memory management circuit 51 has a microprocessor unit (not shown) and a read only memory (not shown), and the control commands are burnt into the read only memory. When the memory storage device 10 is operating, the control commands are executed by the microprocessor unit to perform operations such as data writing, reading, and erasing.

In an exemplary embodiment, the control commands of the memory management circuit 51 may also be stored to a specific area (for example, a system area dedicated to storing system data in a memory module) of the rewritable non-volatile memory module 43 in the form of program codes. In addition, the memory management circuit 51 has a microprocessor unit (not shown), a read only memory (not shown), and a random access memory (not shown). In particular, the read only memory has a boot code, and when the memory control circuit unit 42 is enabled, the microprocessor unit first executes the boot code to load the control commands stored in the rewritable non-volatile memory module 43 to the random access memory of the memory management circuit 51. After that, the microprocessor unit runs the control commands to perform operations such as data writing, reading, and erasing.

In an exemplary embodiment, the control commands of the memory management circuit 51 may also be implemented in the form of hardware. For example, the memory management circuit 51 includes a microcontroller unit, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller unit. The memory cell management circuit is used to manage a memory cell or a memory cell group of the rewritable non-volatile memory module 43. The memory write circuit is used to issue a write command sequence to the rewritable non-volatile memory module 43 to write data into the rewritable non-volatile memory module 43. The memory read circuit is used to issue a read command sequence to the rewritable non-volatile memory module 43 to read data from the rewritable non-volatile memory module 43. The memory erase circuit is used to issue an erase command sequence to the rewritable non-volatile memory module 43 to erase data from the rewritable non-volatile memory module 43. The data processing circuit is used to process data to be written into the rewritable non-volatile memory module 43 and data read from the rewritable non-volatile memory module 43. The write command sequence, the read command sequence, and the erase command sequence may each include one or more program codes or command codes and are used to instruct the rewritable non-volatile memory module 43 to execute corresponding operations such as writing, reading, and erasing. In an exemplary embodiment, the memory management circuit 51 may also issue other types of command sequences to the rewritable non-volatile memory module 43 to instruct to execute corresponding operations.

The host interface 52 is coupled to the memory management circuit 51. The memory management circuit 51 may communicate with the host system 11 through the host interface 52. The host interface 52 may be used to receive and identify commands and data sent by the host system 11. For example, the commands and the data sent by the host system 11 may be sent to the memory management circuit 51 through the host interface 52. In addition, the memory management circuit 51 may send data to the host system 11 through the host interface 52. In the exemplary embodiment, the host interface 52 is compatible with the PCI express standard. However, it must be understood that the disclosure is not limited thereto. The host interface 52 may also be compatible with the SATA standard, the PATA standard, the IEEE 1394 standard, the USB standard, the SD standard, the UHS-I standard, the UHS-II standard, the MS standard, the MMC standard, the eMMC standard, the UFS standard, the CF standard, the IDE standard, or other suitable data transmission standards.

The memory interface 53 is coupled to the memory management circuit 51 and is used to access the rewritable non-volatile memory module 43. For example, the memory management circuit 51 may access the rewritable non-volatile memory module 43 through the memory interface 53. In other words, the data to be written into the rewritable non-volatile memory module 43 is converted into a format acceptable by the rewritable non-volatile memory module 43 via the memory interface 53. Specifically, if the memory management circuit 51 intends to access the rewritable non-volatile memory module 43, the memory interface 53 will send the corresponding command sequence. For example, the command sequences may include the write command sequence instructing to write data, the read command sequence instructing to read data, the erase command sequence instructing to erase data, and corresponding command sequences instructing various memory operations (such as changing a read voltage level, executing a garbage collection operation, etc.). The command sequences are, for example, generated by the memory management circuit 51 and sent to the rewritable non-volatile memory module 43 through the memory interface 53. The command sequences may include one or more signals, or data on a bus. The signals or the data may include command codes or program codes. For example, the read command sequence includes information such as a read recognition code and memory address.

In an exemplary embodiment, the memory control circuit unit 42 further includes an error detecting and correcting circuit 54, a buffer memory 55, and a power management circuit 56.

The error detecting and correcting circuit 54 is coupled to the memory management circuit 51 and is used to execute error detecting and correcting operations to ensure the correctness of the data. Specifically, when the memory management circuit 51 receives a write command from the host system 11, the error detecting and correcting circuit 54 generates a corresponding error correcting code (ECC) and/or error detecting code (EDC) for the data corresponding to the write command, and the memory management circuit 51 writes the data corresponding to the write command and the corresponding error correcting code and/or error detecting code into the rewritable non-volatile in memory module 43. After that, when the memory management circuit 51 reads the data from the rewritable non-volatile memory module 43, the error correcting code and/or the error detecting code corresponding to the data are simultaneously read, and the error detecting and correcting circuit 54 executes the error detecting and correcting operations on the read data according to the error correcting code and/or the error detecting code.

The buffer memory 55 is coupled to the memory management circuit 51 and is used to temporarily store data. The power management circuit 56 is coupled to the memory management circuit 51 and is used to control the power of the memory storage device 10.

In an exemplary embodiment, the rewritable non-volatile memory module 43 of FIG. 4 may include a flash memory module. In an exemplary embodiment, the memory control circuit unit 42 of FIG. 4 may include a flash memory controller. In an exemplary embodiment, the memory management circuit 51 of FIG. 5 may include a flash memory management circuit.

Figure 6:
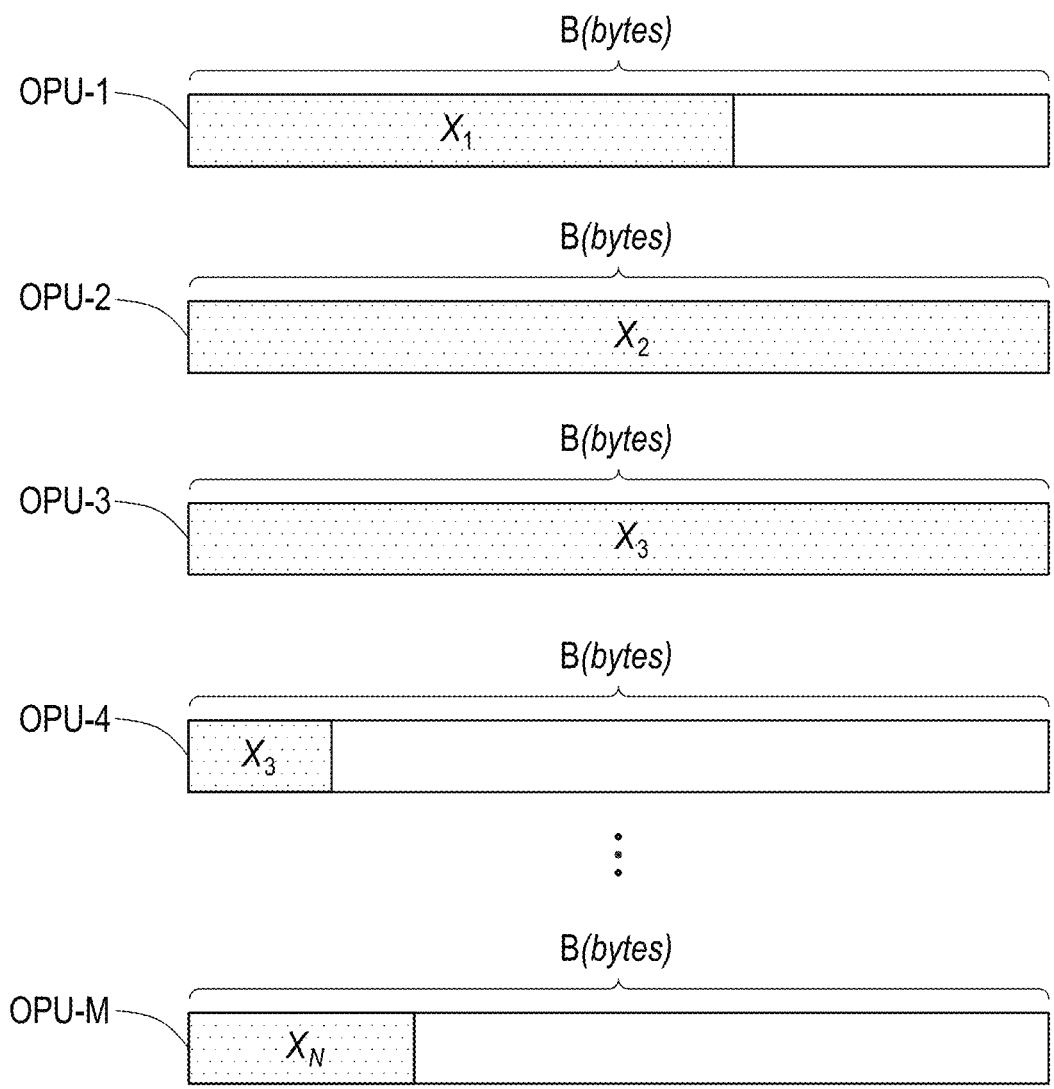
FIG. 6 is a schematic diagram of a first storage space according to a conventional method.

FIG. 6 is a schematic diagram of a first storage space according to a conventional method.

Please refer to FIG. 6. It is assumed that the memory management circuit 51 requires N different types of system management information. The capacity of an i-th type of the system management information is $X_i$ (bytes), where i is an integer and $1 \leq i \leq N$. Specifically, the conventional storage space configuration method is to configure storage spaces for storing each type of system management information in the rewritable non-volatile memory module 43 in units of one operating unit (for example, one physical erasing unit) of the rewritable non-volatile memory module 43, wherein the capacity of the operating unit is B (bytes). In addition, the system management information may, for example, be a mapping table or a variable for managing user data.

As shown in FIG. 6, the capacities of a 1-st type, a 2-nd type, and an N-th type of the system management information are all less than or equal to the capacity of the operating unit, that is $X_1, X_2, X_N \leq B$. Accordingly, the memory management circuit 51 only needs to allocate one operating unit to store the 1-st type (or the 2-nd type or the N-th type) of the system management information. For example, the memory management circuit 51 may allocate a first operating unit OPU-1 to store the 1-st type of the system management information having $X_1$ (bytes). Similarly, the memory management circuit 51 may allocate a second operating unit OPU-2 and an M-th operating unit OPU-M to respectively store the 2-nd type of the system management information having $X_2$ (bytes) and the N-th type of the system management information having $X_N$ (bytes), where M is an integer greater than N.

In addition, the capacity of a 3-rd type of the system management information is greater than the capacity of one operating unit and less than the capacity of two operating units, that is $B < X_3 < 2B$. Accordingly, the memory management circuit 51 may allocate two operating units to store the 3-rd type of the system management information. That is, the memory management circuit 51 may allocate a third operating unit OPU-3 and a fourth operating unit OPU-4 to store the 3-rd type of the system management information having $X_3$ (bytes).

Figure 7:
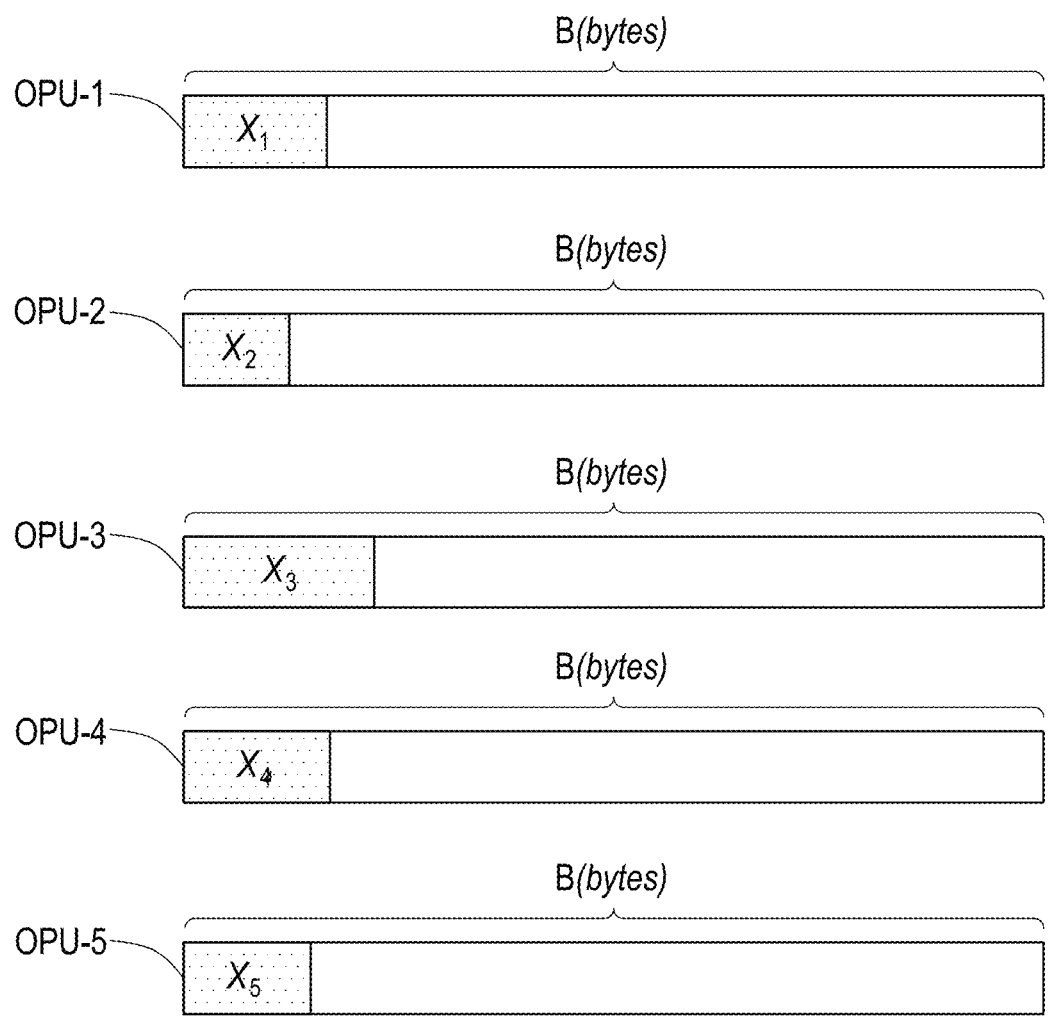
FIG. 7 is a schematic diagram of a second storage space according to a conventional method.

FIG. 7 is a schematic diagram of a second storage space according to a conventional method.

Please refer to FIG. 7. It is assumed that the memory management circuit 51 requires 5 different types of system management information. The capacity of an i-th type of the system management information is $X_i$ (bytes), where i is an integer and $1 \leq i \leq 5$. The method in FIG. 7 is the same as the method in FIG. 6, so there will be no reiteration. Generally speaking, the capacities of the system management information are mostly less than the capacity of one operating unit (B (bytes)), as shown in FIG. 7. The capacities of a 1-st type to a 5-th type of the system management information are all less than the capacity of the operating unit, that is $X_1, X_2, X_3, X_4, X_5 \leq B$. Accordingly, the memory management circuit 51 needs to allocate a first operating unit OPU-1, a second operating unit OPU-2, a third operating unit OPU-3, a fourth operating unit OPU-4, and a fifth operating unit OPU-5 to respectively store the 1-st type of the system management information having $X_1$ (bytes), the 2-nd type of the system management information having $X_2$ (bytes), the 3-rd type of the system management information having $X_3$ (bytes), the 4-th type of the system management information having $X_4$ (bytes), and the 5-th type of the system management information having $X_5$ (bytes).

According to FIG. 6 and FIG. 7, it can be known that the conventional method causes the storage spaces in the rewritable non-volatile memory module 43 to be wasted, and as the types of the system management information increase, the wasted storage spaces also increase, which is difficult to satisfy the requirement for usage capacity by a user.

Figure 8:
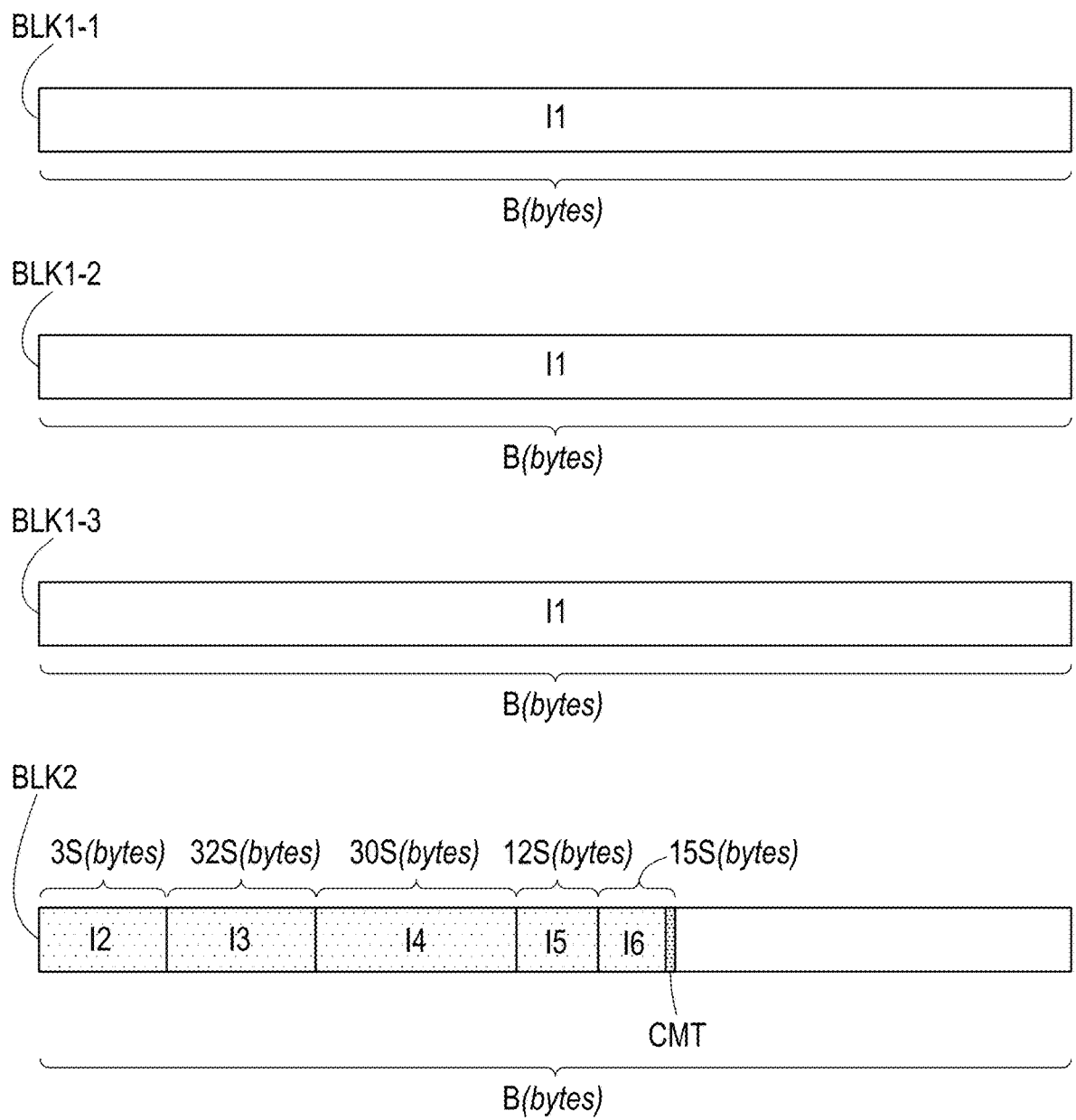
FIG. 8 is a schematic diagram of a storage area according to an exemplary embodiment of the disclosure.

FIG. 8 is a schematic diagram of a storage area according to an exemplary embodiment of the disclosure.

Please refer to FIG. 8. It is assumed that the memory management circuit 51 requires 6 different types of system management information. The system management information may, for example, be a mapping table or a variable for managing user data. For example, the system management information may be a logical-to-physical address mapping table (an L2P table), a bad block table, a free block list, garbage collection information, read count information, or erase count information.

Generally speaking, the capacity of the logical-to-physical address mapping table is approximately the capacity of 2 to 3 physical erasing units, and the logical-to-physical address mapping table is used to manage storage and retrieval of data. The capacity of the bad block table is approximately the capacity of 2 to 3 segments, and the bad block table is used to record defective or damaged physical erasing units in the rewritable non-volatile memory module 43. The capacity of the free block list is approximately the capacity of 1 physical programming unit, and the free block list is used to record locations and states of currently available physical erasing units in the rewritable non-volatile memory module 43. The capacity of the garbage collection information is approximately the capacity of 1 physical programming unit, and the garbage collection information is used to record locations and states of physical erasing units in the rewritable non-volatile memory module 43 that need to be subjected to the garbage collection operation. The capacity of the read count information is approximately the capacity of 10 to 15 segments, and the read count information is used to record a read count of each physical erasing unit, so that the memory management circuit 51 may perform a wear leveling operation. The capacity of the erase count information is approximately the capacity of 10 to 15 segments, and the erase count information is used to record an erase count of each physical erasing unit, so that the memory management circuit 51 may replace physical erasing units whose life spans have reached an upper limit. In the embodiment, the capacity of one physical programming unit is the capacity of 32 segments.

First, when the memory management circuit 51 receives a data management command from the host system 11, the memory management circuit 51 may calculate multiple occupied capacities required for multiple management information respectively stored in multiple physical erasing units based on the capacity of an allocation unit.

Specifically, the memory management circuit 51 may respectively calculate an occupied capacity of each type of system management information based on a user usage habit, the current capacity of each type of system management information, and the capacity of the allocation unit. Since the capacity of each type of system management information varies depending on actual usage situations, the memory management circuit 51 may calculate the occupied capacity of each type of system management information through considering the user usage habit and the current capacity of each type of system management information to adapt to the actual usage situations.

To further explain, the allocation unit is a minimum management unit of the memory control circuit unit 42. The minimum management unit may, for example, be a segment. In the exemplary embodiment, the capacity of the segment is S (bytes). The occupied capacity required for an i-th type of the system management information is nS (bytes), where i and n are integers and $1 \leq i \leq 6$, $n > 0$. In addition, in the exemplary embodiment, the capacity of an operating unit (for example, a physical erasing unit) of the rewritable non-volatile memory module 43 is B (bytes).

Next, the memory management circuit 51 may execute a data consolidation operation based on the occupied capacities. Specifically, when one occupied capacity is greater than the capacity of one physical erasing unit, the memory management circuit 51 may copy the system management information corresponding to the occupied capacity to at least one first physical erasing unit. For example, as shown in FIG. 8, the occupied capacity of a 1-st type of system management information I1 (for example, a logical-to-physical address mapping table) is greater than the capacity of one physical erasing unit and less than the capacity of 3 physical erasing units, the memory management circuit 51 may allocate 3 first physical erasing units BLK1-1 to BLK1-3 to store the system management information I1. In other words, the memory management circuit 51 may copy the system management information I1 to the first physical erasing units BLK1-1 to BLK1-3.

On the other hand, when the sum of at least one occupied capacity is not greater than the capacity of one physical erasing unit, the memory management circuit 51 may copy at least one system management information corresponding to the at least one occupied capacity to a second physical erasing unit. Similarly, please refer to FIG. 8. The occupied capacity of a 2-nd type of system management information I2 (for example, a bad block table) is the capacity of 3 segments, that is, 3 S (bytes). The occupied capacity of a 3-rd type of system management information I3 (for example, a free block list) is 32 S (bytes). The occupied capacity of a 4-th type of system management information I4 (for example, garbage collection information) is 30 S (bytes). The occupied capacity of a 5-th type of system management information I5 (for example, read count information) is 12 S (bytes). The occupied capacity of a 6-th type of system management information I6 (for example, erase count information) is 15 S (bytes).

Since the sum of the capacities occupied by the system management information I2 to I6 is not greater than the capacity B (bytes) of one physical erasing unit, the memory management circuit 51 may allocate a second physical erasing unit BLK2 to store the system management information I2 to I6. In other words, the memory management circuit 51 may copy the system management information I2 to I6 to the second physical erasing unit BLK2.

Finally, the memory management circuit 51 may store a configuration mapping table CMT in the last one of the first physical erasing units BLK1-1 to BLK1-3 and the second physical erasing unit BLK2. For example, as shown in FIG. 8, the memory management circuit 51 may store the configuration mapping table CMT in the second physical erasing unit BLK2.

To further explain, the configuration mapping table CMT may be used to store physical addresses of the 6 types of the system management information (that is, the system management information I1 to I6). Thereby, the memory management circuit 51 may learn storage addresses of the system management information I1 to I6 respectively in the first physical erasing units BLK1-1 to BLK1-3 or the second physical erasing unit BLK2 according to the configuration mapping table CMT in order to manage the system management information I1 to I6.

According to FIG. 8, it can be known that compared with the conventional method (that is, FIG. 6 and FIG. 7), the memory management method of the disclosure can significantly reduce the waste of the storage spaces in the rewritable non-volatile memory module 43 to satisfy the requirement for usage capacity by the user.

Figure 9:
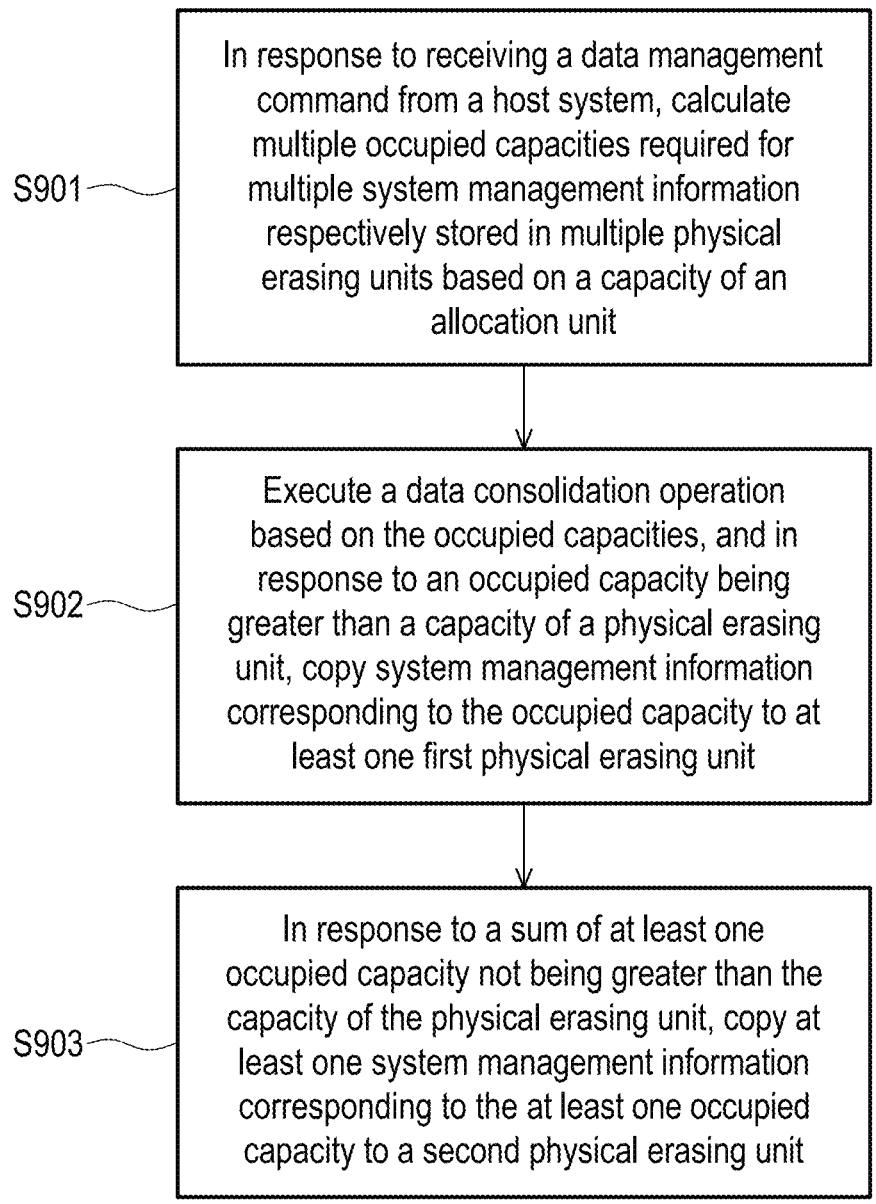
FIG. 9 is a flowchart of a memory management method according to an exemplary embodiment of the disclosure.

FIG. 9 is a flowchart of a memory management method according to an exemplary embodiment of the disclosure.

Please refer to FIG. 9. In Step S901, in response to receiving a data management command from a host system, multiple occupied capacities required for multiple system management information respectively stored in multiple physical erasing units are calculated based on a capacity of an allocation unit. Next, in Step S902, a data consolidation operation is executed based on the occupied capacities, and in response to an occupied capacity being greater than a capacity of a physical erasing unit, system management information corresponding to the occupied capacity is copied to at least one first physical erasing unit. Finally, in Step S903, in response to a sum of at least one occupied capacity not being greater than the capacity of the physical erasing unit, at least one system management information corresponding to the at least one occupied capacity is copied to a second physical erasing unit.

The implementation details of Steps S901 to S903 have been described in detail in the foregoing exemplary embodiments and will not be reiterated. It is worth noting that each step in FIG. 9 may be implemented by multiple program codes or circuits, and the disclosure is not limited thereto. In addition, the method of FIG. 9 may be used in conjunction with the foregoing exemplary embodiments or may be used alone, and the disclosure is not limited thereto.

In summary, in the memory management method, the memory storage device, and the memory control circuit unit of the disclosure, the occupied capacities required for the management information may be calculated based on the minimum management unit of the memory control circuit unit to configure the first physical erasing unit and the second physical erasing unit for storing the system management information according to the occupied capacities. In addition, in the memory management method, the memory storage device, and the memory control circuit unit of the disclosure, the configuration mapping table for storing the physical addresses of the system management information may also be established in order to manage the system management information. In this way, the massive waste of the storage spaces caused by the conventional method can be greatly reduced, and the utilization rate of the rewritable non-volatile memory module can be improved to satisfy the requirement for usage capacity by the user.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A memory management method for a memory storage device, wherein the memory storage device comprises a rewritable non-volatile memory module and a memory control circuit unit, the memory management method comprising:
    in response to receiving a data management command from a host system, calculating a plurality of occupied capacities required for a plurality of system management information respectively stored in a plurality of physical erasing units based on a capacity of an allocation unit, wherein the system management information is respectively one of a logical-to-physical address mapping table (an L2P table), a bad block table, a free block list, garbage collection information, read count information, and erase count information;
    executing a data consolidation operation based on the occupied capacities, and in response to a first occupied capacity of the occupied capacities being greater than a capacity of a physical erasing unit, copying system management information corresponding to the first occupied capacity to a plurality of first physical erasing units; and
    in response to a sum of a plurality of second occupied capacities of the occupied capacities not being greater than the capacity of the physical erasing unit, copying all system management information corresponding to the second occupied capacities to a second physical erasing unit,
    wherein the step of calculating the occupied capacities required for the system management information respectively stored in the physical erasing units based on the capacity of the allocation unit comprises:
    respectively calculating each of the occupied capacities based on a user usage habit, a current capacity of each of the system management information, and the capacity of the allocation unit,
    wherein the allocation unit is a minimum management unit of the memory control circuit unit, wherein the minimum management unit is a segment,
    wherein the occupied capacities reflect actual usage situations,
    wherein the capacity of the allocation unit is base unit of the occupied capacities, wherein each of the occupied capacities is expressed as the capacity of n allocation unit, wherein n is a positive integer.

2. The memory management method according to claim 1, further comprising:
    storing a configuration mapping table in a last one of the first physical erasing units and the second physical erasing unit.

3. The memory management method according to claim 2, wherein the configuration mapping table is used to store a plurality of physical addresses of the system management information.

4. A memory storage device, comprising:
    a connection interface unit, used to couple to a host system;
    a rewritable non-volatile memory module; and
    a memory control circuit unit, coupled to the connection interface unit and the rewritable non-volatile memory module, wherein
    the memory control circuit unit is used to, in response to receiving a data management command from the host system, calculate a plurality of occupied capacities required for a plurality of system management information respectively stored in a plurality of physical erasing units based on a capacity of an allocation unit, wherein the system management information is respectively one of a logical-to-physical address mapping table, a bad block table, a free block list, garbage collection information, read count information, and erase count information,
    the memory control circuit unit is further used to execute a data consolidation operation based on the occupied capacities, and in response to a first occupied capacity of the occupied capacities being greater than a capacity of a physical erasing unit, copy system management information corresponding to the first occupied capacity to a plurality of first physical erasing units, and
    the memory control circuit unit is further used to, in response to a sum of a plurality of second occupied capacities of the occupied capacities not being greater than the capacity of the physical erasing unit, copy all system management information corresponding to the second occupied capacities to a second physical erasing unit,
    wherein the memory control circuit unit is further used to respectively calculate each of the occupied capacities based on a user usage habit, a current capacity of each of the system management information, and the capacity of the allocation unit,
    wherein the allocation unit is a minimum management unit of the memory control circuit unit, wherein the minimum management unit is a segment,
    wherein the occupied capacities reflect actual usage situations,
    wherein the capacity of the allocation unit is base unit of the occupied capacities, wherein each of the occupied capacities is expressed as the capacity of n allocation unit, wherein n is a positive integer.

5. The memory storage device according to claim 4, wherein the memory control circuit unit is further used to store a configuration mapping table in a last one of the first physical erasing units and the second physical erasing unit.

6. The memory storage device according to claim 5, wherein the configuration mapping table is used to store a plurality of physical addresses of the system management information.

7. A memory control circuit unit, used to control a rewritable non-volatile memory module, the memory control circuit unit comprising:
- a host interface, used to couple to a host system;
- a memory interface, used to couple to the rewritable non-volatile memory module; and
- a memory management circuit, coupled to the host interface and the memory interface, wherein
- the memory management circuit is used to, in response to receiving a data management command from the host system, calculate a plurality of occupied capacities required for a plurality of system management information respectively stored in a plurality of physical erasing units based on a capacity of an allocation unit, wherein the system management information is respectively one of a logical-to-physical address mapping table, a bad block table, a free block list, garbage collection information, read count information, and erase count information,
- the memory management circuit is further used to execute a data consolidation operation based on the occupied capacities, and in response to a first occupied capacity of the occupied capacities being greater than a capacity of a physical erasing unit, copy system management information corresponding to the first occupied capacity to a plurality of first physical erasing units, and
- the memory management circuit is further used to, in response to a sum of a plurality of second occupied capacities of the occupied capacities not being greater than the capacity of the physical erasing unit, copy all system management information corresponding to the second occupied capacities to a second physical erasing unit,
- wherein the memory management circuit is further used to respectively calculate each of the occupied capacities based on a user usage habit, a current capacity of each of the system management information, and the capacity of the allocation unit,
- wherein the allocation unit is a minimum management unit of the memory control circuit unit, wherein the minimum management unit is a segment,
- wherein the occupied capacities reflect actual usage situations,
- wherein the capacity of the allocation unit is base unit of the occupied capacities, wherein each of the occupied capacities is expressed as the capacity of n allocation unit, wherein n is a positive integer.

8. The memory control circuit unit according to claim 7, wherein the memory management circuit is further used to store a configuration mapping table in a last one of the first physical erasing units and the second physical erasing unit.

9. The memory control circuit unit according to claim 8, wherein the configuration mapping table is used to store a plurality of physical addresses of the system management information.

* * * * *